United States Patent [19]

Worsley et al.

[11] Patent Number: 4,849,915
[45] Date of Patent: Jul. 18, 1989

[54] MONITORING SHEET LENGTH

[75] Inventors: David R. Worsley; Trevor J. Conner, both of Hampshire, England

[73] Assignee: De La Rue Systems, Ltd., England

[21] Appl. No.: 873,369

[22] Filed: Jun. 12, 1986

[30] Foreign Application Priority Data

Jun. 17, 1985 [GB] United Kingdom ............... 8515272

[51] Int. Cl.⁴ .................. G06F 15/46; B65H 43/08
[52] U.S. Cl. ................... 364/562; 364/471; 271/258; 271/261; 377/8; 340/673
[58] Field of Search ............. 364/471, 405, 406, 408, 364/506, 507, 559–562, 564; 340/673, 674; 377/8, 39; 271/258, 259, 261; 355/14 C

[56] References Cited

U.S. PATENT DOCUMENTS

| | | | |
|---|---|---|---|
| 4,179,685 | 12/1979 | O'Maley | 340/146.3 H |
| 4,275,879 | 6/1981 | Yamashita et al. | 340/674 |
| 4,504,916 | 3/1985 | Oka | 364/471 |
| 4,653,008 | 3/1987 | Kai et al. | 364/471 |

FOREIGN PATENT DOCUMENTS 0072448 7/1982 European Pat. Off. .
0068418 11/1982 European Pat. Off. .
3143270 10/1981 Fed. Rep. of Germany .
2129126 6/1982 United Kingdom .

Primary Examiner—Parshotam S. Lall
Assistant Examiner—Brian M. Mattson
Attorney, Agent, or Firm—Ostrolenk, Faber, Gerb & Soffen

[57] ABSTRACT

Apparatus which carries out a method for monitoring the length of sheets (such as banknotes) passing a predetermined position includes two pairs of rollers 1, 2 defining respective nips 5, 6 through which a sheet passes. The passage of a sheet causes radial movement of portions 11 of the rollers 2 which is detected by detectors 12 mounted in a shaft 4. The passage of a sheet causes respective counters 15, 16 to be incremented at a relatively fast sheet. The length of the sheet is determined by monitoring the counter, counters 15 and 16, during the plurality of successive intervals. The leading edge of the sheet appears during the first of the successive intervals and the trailing edge of the sheet appears during the last of the successive intervals. The total length of the sheet is determined by counting the total number of intervals between the first and last interval and counting a portion of the first and last intervals, respectively, determined by the ratio of the counter in the first and last intervals and immediately following and preceding intervals, respectively.

17 Claims, 3 Drawing Sheets

MONITORING SHEET LENGTH

FIELD OF THE INVENTION

The invention relates to methods and apparatus for monitoring the length of sheets passing a predetermined position.

DESCRIPTION OF THE PRIOR ART

There is a requirement, particularly in the case of document counting and sorting, for example banknote counting and sorting to determine accurately the length of sheets passing a predetermined position. This determination can be used for a variety of purposes such as the detection of unacceptable sheets or to distinguish between sheets having different lengths so that they may be sorted in appropriate directions.

In the past, sheets have been fed by transport means past a predetermined position and the presence of a sheet at the predetermined postion has been sensed at regularly spaced intervals. A rough indication of the length of a sheet is then derived by counting the number of sensing intervals at which a sheet was sensed. One problem with this arrangement is that, in general, leading and trailing edges of a sheet will not exactly coincide with a sensing instant. This means that prior art systems will determine different lengths for substantially identical sheets. In some cases, this may be acceptable but particularly in the case of detecting counterfeit documents and for distinguishing between certain genuine, but different denomination banknotes, a more accurate determination of length is required.

It should be understood that in this specification the term "length" means the dimension of a sheet in the direction of movement of the sheet. In practice, this dimension may not be the longest dimension of the sheet.

SUMMARY OF THE INVENTION

In accordance with one aspect of the present invention, a method of monitoring the length of sheets passing a predetermined position comprises (1) monitoring a relatively fast rate count at least in two pairs of intervals wherein
  (a) during one interval of each pair leading and trailing edges of the sheet are sensed respectively, the count being monitored for a period during the interval related to the time at which the leading or trailing edge passes the predetermined position and during the other interval of each pair the count is monitored for the entire interval,
  (b) during each interval the count is incremented at a constant rate, and
  (c) the duration of the intervals is long compared with the time between successive counts;

(2) determining respective total counts from the monitored counts;

(3) determining first and second values related to the lengths of the portions of the sheet passing the predetermined position during the intervals in which the leading and trailing edges are sensed by comparing the total counts monitored in the intervals of each pair;

(4) determining a third value related to the length of the portion of the sheet passing the predetermined position between the intervals in which the leading and trailing edges are sensed; and (5) deriving a value related to the total length of the sheet passing the predetermined position from the first, second, and third values.

The invention improves upon the prior art systems by determining values related to the length of the portions of the sheet passing the predetermined position during the intervals in which the leading and trailing edges are sensed. This enables a very accurate determination of the length of the sheet to be achieved.

It should be noted that the invention has several advantages. Firstly, the overall measurement is substantially independent of the speed of the sheet. Secondly, the measurement accuracy is independent of the speed of the count while the count rate itself defines the leading and trailing edge resolutions. Thus, the faster the count rate, the greater the resolution obtained. Thirdly, the invention obviates the need for the expensive and bulky shaft encoding devices which would otherwise be necessary to achieve similar resolutions.

Although it must be assumed that the speed of the sheet during any particular interval is substantially constant, the speeds in successive intervals do not necessarily have to be the same. Preferably, however, at least during each pair of intervals the sheet moves at the same substantially constant rate. The first and second values may then be determined simply by directly comparing the number of increments of the count in the successive intervals of each pair. This considerably simplifies the later processing steps since otherwise some additional compensation would be required.

Preferably, the intervals of each pair are successive so as to maximize accuracy by minimizing the chance of significant changes in the count rate.

Conveniently, the two pairs of intervals are separated by ten to twenty different intervals. However, in some methods each pair of intervals may share a common interval. This common interval, for which typically a total count will be determined, preferably occurs while a sheet is passing the predetermined position but it could occur outside this time.

Similarly, it is preferable if the count is monitored only when a sheet is sensed at the predetermined position. This again reduces the risk of obtaining erroneous counts which could occur when monitoring part of the sheet transport system due to differences between the feed rate when a note is present and when a note is not present.

During the interval when the leading edge of the sheet is sensed the count is preferably monitored from the detection of the leading edge to the end of the interval; similarly during the interval when the trailing edge is sensed, the count is preferably monitored from the beginning of the interval to the detection of the trailing edge. However, the count could be monitored from the time at which the trailing edge is sensed to the end of the interval and from the beginning of an interval to the time at which a leading edge is sensed. In this case, these counts could be subtracted from the count for a whole interval to produce the counts required.

Typically step 5 comprises summing the first, second and third values to generate the fourth value.

Step 4 may be carried out in any conventional way, but conveniently this step comprises determining the number of intervals during which the sheet moves through substantially the same distance past the predetermined position or positions. This number can then be multiplied by a constant relating to the distance of movement to provide the third value.

In order to determine the time of commencement and termination of each interval, step 1 may include the step of monitoring the rotation of a shaft of transport means controlling movement of the sheets. This may most conveniently be achieved by using a conventional slotted timing disc.

The counts which are monitored could be determined by monitoring a continuously incrementing count at appropriate times. Conveniently, however, the count is initiated at least when a leading edge of the sheet is sensed and is stopped when a trailing edge is sensed.

Furthermore, the count could be incremented at different constant rates in each interval, but this would lead to more complex processing.

Preferably, the method comprises carrying out steps 1–5 at two predetermined postions laterally offset from one another relative to the direction of movement of the sheets. By carrying out the method at two laterally offset positions, it is possible to compensate for skew fed sheets.

Preferably, there are about 30 fast rate count pulses in each interval. Other numbers of fast rate count pulses are acceptable ranging from, for example, 10 to 50 per interval. The number depends on the distance moved by a sheet in one interval and the accuracy required.

In accordance with a second aspect of the present invention, a method of detecting the acceptability of sheets comprises (a) monitoring the length of a sheet at two laterally spaced positions;

(b) determining the difference between the monitored lengths;

(c) comparing the difference with a predetermined threshold to determine whether the difference is large or small;

(d)
  (i) if the difference is large, comparing each monitored length with predetermined reference values to determine the acceptability of the sheet; or
  (ii) if the difference is small, determining the average of the two lengths, and comparing the average with one or more predetermined reference values to determine the acceptability of the sheet.

This method enables not only skew fed sheets to be accepted if they are genuine, but also sheets which have cuts, tears, holes and the like.

Step a preferably comprises a method according to the first aspect ot the invention although the method is applicable to other known methods of monitoring sheet length.

Step c may comprise determining the difference to be large if it exceeds the predetermined threshold and otherwise determining the difference to be small.

It will be appreciated that the methods according to the first and second aspects of the invention are particularly applicable to banknote monitoring in, for example, banknote counting or sorting apparatus.

In accordance with a third aspect of the present invention, apparatus for monitoring the length of sheets passing a predetermined position comprises transport means for transporting the sheets past the predetermined position; sensing means for sensing the presence of a sheet at the predetermined postion; a counter which may be incremented at a relatively fast rate; processing means for carrying out steps 1 to 5 of a method according to the first aspect of the invention; and comparison means for comparing the determined length with a reference and for providing a corresponding output signal.

The sensing means may be provided by any conventional system such as an opacity detector. Preferably, however, the sensing means comprises a detector for detecting the passage of a sheet through a nip between a pair of rollers. An example of a suitable arrangement is illustrated in our copending European patent application No. 0130824.

BRIEF DESCRIPTION OF THE DRAWINGS

In order that the invention may be better understood, an embodiment of a banknote feeding system for carrying out methods according to the invention will now be described with reference to the accompanying drawings; in which.

DETAILED DESCRIPTION OF AN EMBODIMENT

Figure 1:
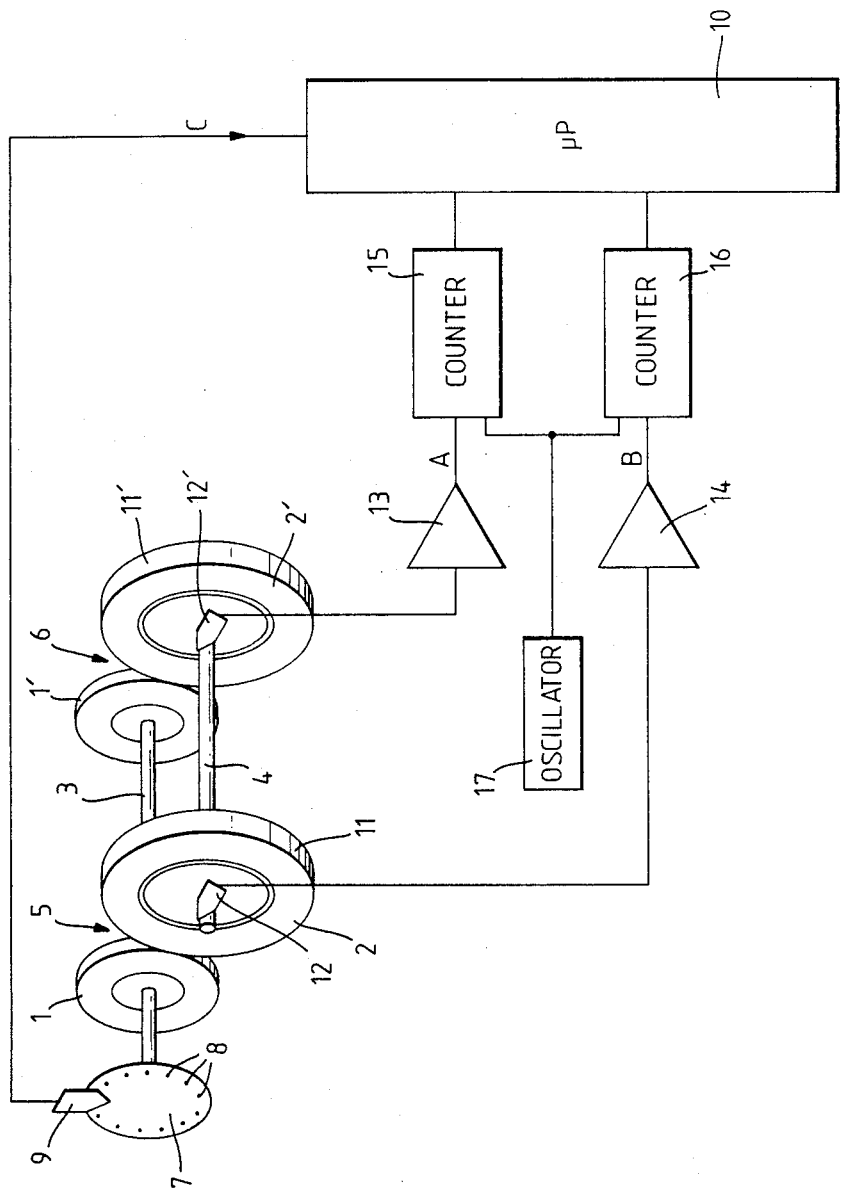
FIG. 1 is a schematic view of the sensing system of the apparatus partly in block diagram form.

The sensing system shown in FIG. 1 comprises two pairs of rollers 1, 1' and 2, 2', respectively. The rollers 1' are non-rotatably mounted on a shaft 3, while the rollers 2, 2' are rotatably mounted on a shaft 4. The rollers 1, 1' and 2, 2' form part of a transport system (not shown) for transporting single sheets from a hopper to a stacking position in order to count the number of sheets in the hopper. An example of such a counting system is described in more detail in the copending European patent application mentioned above and is incorporated in the De La Rue 2300 banknote counting machine. Each pair of rollers 1, 2, 1', 2', respectively, defines a respective nip 5, 6. A slotted timing wheel 7 of conventional form is non-rotatably mounted to an extension of the shaft 3. The slots 8 of the wheel 7 are equally, circumferentially spaced around the wheel 7 and the light emitting diode and transistor of a detector 9 are positioned on either side of the wheel 7. Output signals (C) from the detector 9 are fed to a microprocessor 10 such as an INTEL 8040.

When a banknote enters the nips 5, 6 this will cause radial movement of rotatable portions 11 of the rollers 2, 2'. This movement will be detected by detectors 12, 12' mounted in the shaft 4 each of which provides a corresponding output signal which is fed to amplifiers 13, 14 respectively. The output signals (A,B) from the amplifiers 13, 14 are fed to enabling inputs of respective counters 15, 16. An oscillator 17 generates a substantially constant high pulse rate output signal (e.g. 21 MHz) which is fed to each of the counters 15, 16. When the counters 15, 16 are enabled by the respective signals A, B, they are incremented at the rate of the pulse signal from the oscillator 17.

When no sheet is present in the nips 5, 6, first signals are output from the detectors 12, 12' and fed to the amplifiers 13, 14. The amplifier 13, 14 then generates output signals which disable counters 15, 16. When a banknote enters the nips 5, 6, the detectors, 12 issue a second signal (which may in certain cases have zero amplitude) which causes amplifiers 13, 14 to enable the respective counters 15, 16. It should be understood that the amplifiers 13, 14 are chosen to be suitable for causing the respective counters 15, 16 to be enabled when a sheet is detected.

Figure 2:
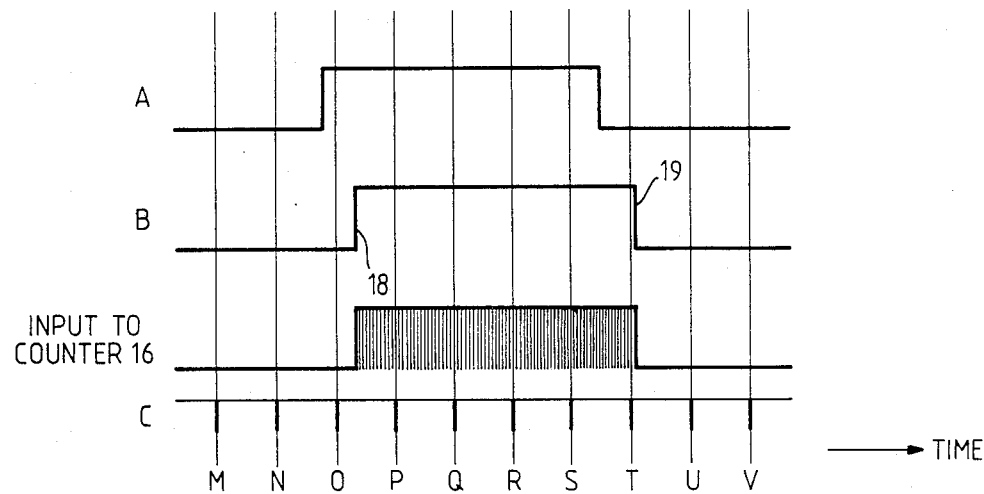
FIG. 2 is a pulse diagram illustrating output signals from the sensing system illustrated in FIG. 1.

FIG. 2 illustrates the case where a banknote is fed slightly skew to the feed direction so that a leading edge of the banknote reaches the nip 6 before the nip 5 is reached. For the sake of example, the situation relative to the nip 5 will be described in more detail. As soon as a banknote is detected in the nip 5, an appropriate signal is fed via the amplifier 14 to the counter 16 to enable the counter. This is indicated by the vertical line 18 in FIG. 2. The counter 16, which has previously been reset to zero, then starts to count pulses received from the oscillator 17.

At the same time, as the rollers 2, 2' rotate, periodic signals (C) are output from the detector 9 to the microprocessor 10 at a rate for example of 700 per second. These signals relate to the time intervals during which the rollers 2, 2' have rotated through a fixed angle corresponding to movement of the note through a distance of typically 4.7 mm. Since the slots 8 of the timing wheel 7 are equally spaced, this will correspond to equal angles of rotation. (Unequal spacing could also be used with more complex processing). It should be noted that the signals from the detector 9 may not be equally spaced in time if the rollers 2, 2' do not rotate at a constant rate. However substantially equal units of length will be transported through the nips between each pair of slots. For convenience, successive signals from the detector 9 over the period concerned are labelled M-V respectively in FIG. 2. In practice, a much larger number of intervals will occur between the passage of leading and trailing edges, typically in the order 10-20. It should be noted that the pulse rate delivered by the oscillator 17 is considerably higher than the rate of pulses from the detector 9.

As has previously been explained, as soon as the counter 16 is enabled it starts to count pulses from the oscillator 17. Thus, at the time P the microprocessor 10 will derive a count value from the counter 16 (and also the counter 15). At this time, the microprocessor 10 also causes the counters 15, 16 to be reset. At the next signal from the detector 9 (Q), the counters 15, 16 are again read (and reset) to determine second count values. It is assumed that the feed rate of the banknote in these two time intervals ending at P and Q is the same so that by simply taking the ratio of the counts read from the counter 16, it is possible to determine what proportion of the interval O-P corresponded to the presence of a note in the nip 5.

At successive signals from the detector 9, the microprocessor 10 reads the counts from the counters 15, 16 and then resets the counters for the next interval. After the signal at time T, the trailing edge of the banknote passes through the nip 5 and the signal B from the detector 12 changes, as indicated by line 19 in FIG. 2, to disable the counter 16. At the time U, the microprocessor 10 reads the count in the counter 16 which will be much smaller than for a fully counted interval such as Q-R. Again, by determining the proportion of the count determined at the time U with the count determined at the time T a value related to the length of the final portion of the note can be determined.

Since the occurrence of signals Q, R, S and T corresponds to the passage of a certain length of sheet, it is a simple matter to determine the full length of the sheet. For example if there are X intervals during which a sheet remains in the appropriate nip for the entire interval then the total length of the sheet may be represented by a value given by the formula:

$$(P/Q + X + U/T)$$

where in this particular example $X=4$ and P, Q, U, T represent the counts determined at the end of these intervals. This value can be used as it stands or converted to an actual length if the rotation distance of the circumference 11 of the roller 2 between successive signals from the detector 9 is known.

Figure 3:
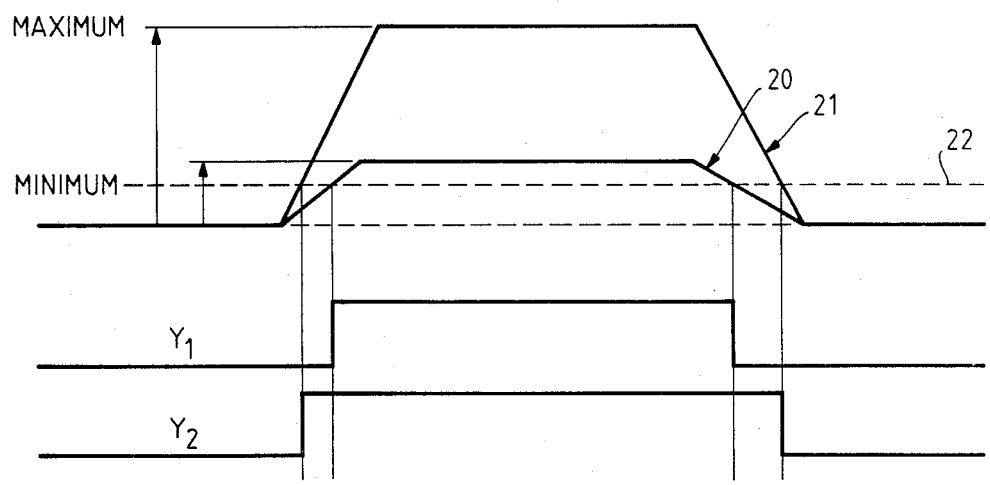
FIG. 3 is a signal diagram illustrating the variation in duration of counter enabling signals due to different thickness banknotes.

The length measurement described above can vary by a small amount in accordance with the thickness of the note being fed. FIG. 3 illustrates two examples of the output signal 20, 21 due to the passage of a relatively thin note and a relatively thick note respectively. The presence of a note in the nip is determined by comparing these output signals 20, 21 with a threshold 22 so that a note is only detected when this minimum threshold 22 is exceeded. However, it will be seen that the signal 20 due to a thin note takes longer to exceed the threshold 22 than the signal 21 corresponding to a thick note. this means that the counter enabling signals $Y_1$, $Y_2$ (equivalent to signals A, B in FIGS. 1 and 2) will be generated at different times, as can be seen in FIG. 3, depending upon the thickness of a note. This is, in certain circumstances, undesirable since it will lead to an error in the determination of the length of the note.

To compensate for thickness, it is therefore preferred that the microprocessor 10 reduce the calculated length of a banknote having a thickness greater than some minimum thickness, say due to a minimum thickness banknote, in accordance with the following formula:

Compensated length = Measured length $- T_n/K$ where $T_n$ is representative of the thickness of the sheet as determined by the signals from the detector and will lie between certain minimum and maximum thickness values. K is chosen to ensure that the units of $T_n/K$ correspond to the units of "measured length".

In a typical example, the minimum thickness of a sheet which is allowable may be 20 while the maximum allowable thickness is 60, $T_n$ lying between these values and being typically 25. In this example, K is chosen to be 10.

The values of $T_n$ and K depend on the processing equipment used and K is chosen empirically.

In the case shown in FIG. 2, the banknote is skew fed and this can be compensated for by using a formula of the form:
True length =

Calculated length × Cosine (Arctangent (Ls/Ld))

OR
True length =

$$\text{Calculated length} \times \frac{L_d}{\sqrt{L_d^2 + L_s^2}}$$

where
  $L_d$ = distance between detectors 12, 12' being typically 60 mm.
and

Ls = length of skew measurement between left and right detectors 12, 12'.

The micriprocessor 10 is used to calculate the true length. Note that the true length equals the calculated length when the skew measurement is zero.

An alternative method for determining the acceptability of banknotes will now be described. In this method, the apparatus shown in FIG. 1 is again used but the microprocessor 10 determines the length of the banknote as separately detected by each detector 12. These lengths $L_1$, $L_2$ are then processed in the following manner.

Figure 4:
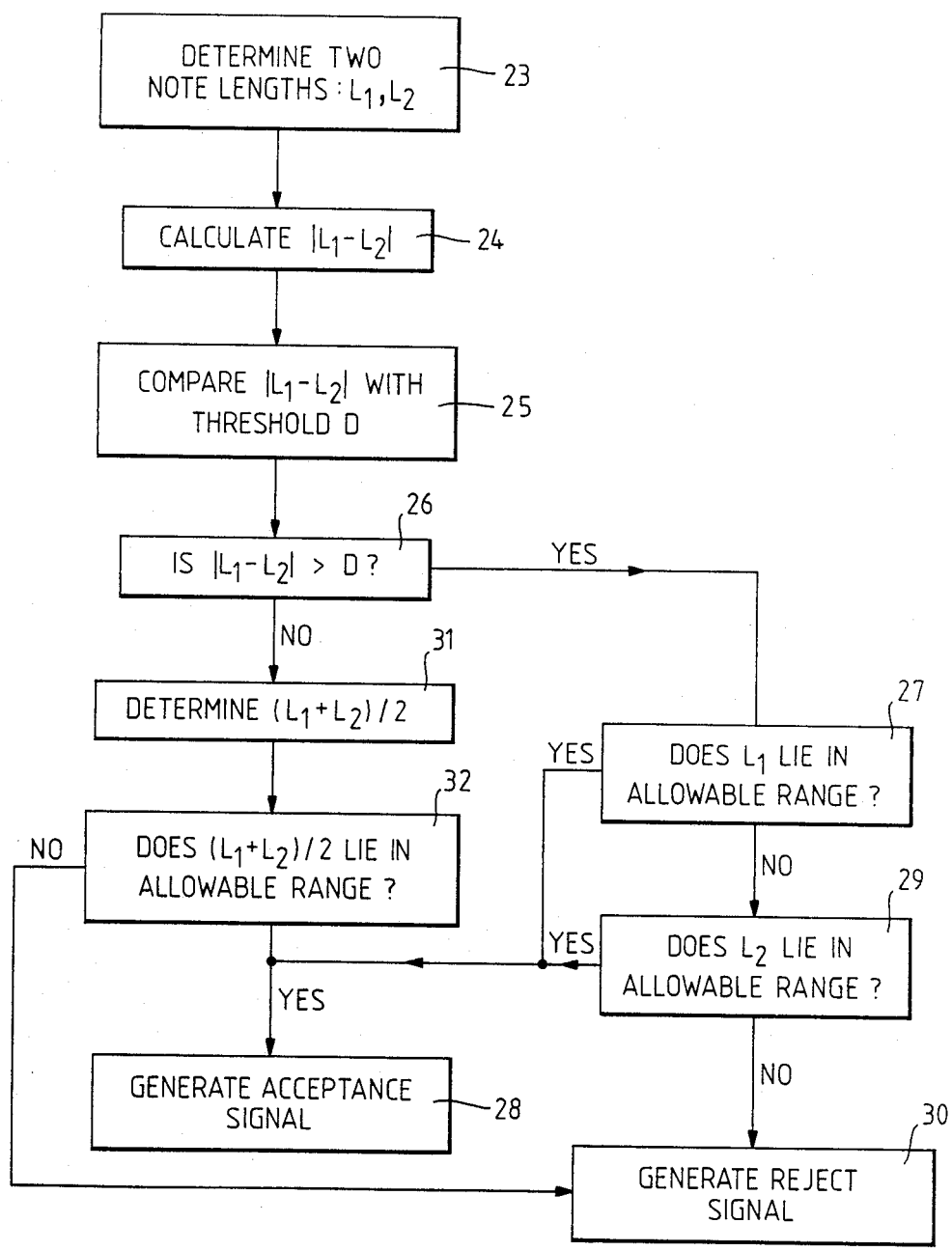
FIG. 4 is a flow diagram illustrating some of the steps carried out by the controlling microprocessor.

FIG. 4 is a flow diagram illustrating part of the operation of the microprocessor.

After the two note lengths $L_1$, $L_2$ have been determined 23, the difference between the two lengths is calculated 24. This difference is then compared with a preset threshold D in a step 25. Typically, in the case of banknotes, D may be set to about 10 mm.

If the difference between the measured note length is greater than D (step 26) this is taken to indicate a banknote, part of which is torn, cut, or folded and the like. However, such a banknote may still be a genuine banknote and the method set out in FIG. 4 provides a way in which the banknote may be accepted despite this apparent difference in note length.

In step 27, the measured length $L_1$ is compared with an allowable range of lengths which may be defined in terms of a nominal length and a tolerance or, preferably, by upper and lower values. These values may have been preset or previously determined from the first sheet of a batch which is fed through the note counter.

An example of suitable maximum and minimum length limits is 68 mm and 62 mm respectively.

If $L_1$ is found to lie within the allowable range, the microprocessor 10 generates an acceptance signal (step 28) which may be used to increment a running total of a counter.

If $L_1$ is found not to lie within the allowable range, $L_2$ is compared with the allowable range (step 29), and a similar acceptance signal is generated if $L_2$ is found to lie within the range.

If, however, both $L_1$ and $L_2$ lie outside the allowable range, then a reject signal is generated (30) by the microprocessor 10. This may be used, for example, to stop the machine to enable the unacceptable note to be extracted.

If, in step 26, the difference between the measured length is found to be less than or equal to the threshold D, the average of the two lengths is determined, 31. This is because the difference may be due to a genuine sheet being fed slightly askew.

The average measured length is then compared with the same allowable range used in steps 27 to 29, in a step 32. If the average is found to lie within the range, then the general acceptance signal 28 is generated while if it is outside the range, the reject signal is generated.

Of course, it should be understood that additional tests may be carried out on the banknotes as they are fed so that although the length may be determined to be acceptable, the banknote may still be judged not to be genuine if it fails, for example, an opacity test.

We claim:

1. A method of monitoring the length of a sheet passing a predetermined position, the method comprising the steps of:
   (1) counting clock signals having a constant rate during first and second pairs of intervals, the duration of said intervals being long compared with the time between successive said clock signals, the length of each said interval being substantially equal to the length of the other of said intervals; wherein during one interval of said first pair and one interval of said second pair a leading and trailing edge of said sheet are sensed, respectively; said clock signals being counted during said one interval of said first and second pairs for a period related to the time at which said leading edge and said trailing edge passes said predetermined position, respectively; said clock signals being counted for the entirety of the remaining interval of each said pair;
   (2) determining first and second values related to the lengths of those portions of said sheet which pass said predetermined position during said one interval of said first and second pairs, respectively, by comparing said number of clock signals counted during said first and second intervals of each pair, respectively;
   (3) determining a third value related to the length of that portion of said sheet passing said predetermined position during the time period between said one interval of said first and second pairs; and
   (4) determining a fourth value related to the total length of said sheet passing said predetermined position from said first, second, and third values.

2. A method according to claim 1, wherein step 3 comprises the step of determining a number of intervals, substantially equal in length to said first and second pairs of intervals, during which said sheet moves past said predetermined position after said second interval of said first pair and before said second interval of said second pair.

3. A method according to claim 1, wherein said two pairs of intervals are separated by ten to twenty intervals of substantially equal duration to said intervals of said pair of intervals.

4. A method according to claim 1, wherein said clock signals are counted only when a sheet is sensed at said predetermined position.

5. A method according to claim 4, wherein said clock signals are counted beginning from the instant when said leading edge of said sheet is sensed and continuing until said trailing edge is sensed.

6. A method according to claim 1, wherein said intervals are defined by timing signals generated by monitoring a rotation of a shaft of transport means controlling movement of said sheets, each timing signal being generated in response to an equal rotation of said shaft.

7. A method according to claim 1, wherein said first, second and third values are added to generate said fourth value.

8. A method according to claim 1, wherein there are approximately 30 clock signals generated during each said interval.

9. A method according to claim 1, further comprising carrying out steps 1-4 at two predetermined positions laterally offset from one another relative to a direction of movement of said sheets past said predetermined position.

10. A method of monitoring the length of banknotes according to claim 1.

11. A method according to claim 1, wherRrein said second intervals of said two pairs of intervals coincide with each other.

12. Apparatus for monitoring a length of sheets passing a predetermined position, said apparatus comprising:
- (A) transport means for transporting the sheets past said predetermined position;
- (B) sensing means for sensing the presence of a sheet at said predetermined position;
- (C) a counter;
- (D) processing means for:
  - (1) counting clock signals having a constant rate during first and second pairs of intervals, the duration of said intervals being long compared with the time between successive said clock signals, each said interval being substantially equal to the other said intervals; wherein during one interval of said first pair and one interval of said second pair a leading and trailing edge of said sheet are sensed, respectively; said clock signals being counted during said one interval of said first and second pairs for a period related to the time at which said leading edge and said trailing edge passes said predetermined position, respectively; said clock signals being counted for the entirety of the remaining interval of each said pair;
  - (2) determining first and second values related to the lengths of those portions of said sheet passing said predetermined position during said one interval of said first and second pairs, respectively, by comparing said number of clock signals counted during said first and second intervals of each pair, respectively;
  - (3) determining a third value related to the length of that portion of said sheet passing the predetermined position between said one interval of said first and second pairs; and
  - (4) determining a fourth value related to the total length of said sheet passing said predetermined position from said first, second, and third values; and
  - (5) comparison means for comparing said fourth value with a reference value and for providing a corresponding output signal.

13. Apparatus according to claim 12, wherein said transport means includes a shaft which is rotatable to control movement of said sheets, said sensing means comprising a slotted timing disc non-rotatably mounted to said shaft and detection means fixed relatively to said timing disc for sensing the movement of slots past said sensing means and for generating output signals as a function thereof.

14. Apparatus according to claim 13, wherein said output signals generated by said detection means cause a count in said counter to be reset.

15. Apparatus according to claim 12, wherein said counter is enabled by said sensing means when the leading edge of a sheet is sensed and disabled when the trailing edge of a sheet is sensed.

16. A method for monitoring the length of a sheet moving in a forward direction past a predetermined position, said sheet having a leading edge, a trailing edge and a body portion extending between said leading and trailing edges, said method comprising the steps of:
  moving said sheet past said predetermined position such that said leading edge passes said predetermined position, followed by said body portion, followed by said trailing edge;
  counting clock signals having a constant frequency during at least a portion of each of a plurality of consecutive time intervals, each time interval defining consecutive distance intervals of equal length;
  said leading edge passing said predetermined position during a first one of said intervals; said trailing edge passing said predetermined position during a last one of said intervals, said body portion passing said predetermined position during the remaining of said intervals;
  counting said clock signals during only a portion of said first and last intervals determined by the position of said leading and trailing edges, respectively, during said first and last intervals, respectively;
  counting said clock signals during the entirety of the remaining said time intervals; and
  determining the length of said sheet as a function of the ratio between the number of said clock signals counted during said first time interval and that said time interval which immediately follows said first time interval and the ratio between the number of said clock signals counted during said last time interval and that said time interval immediately preceding said last interval as well as the number of said time intervals between said first and last time intervals.

17. Apparatus for monitoring the length of the sheet moving in a forward direction past a predetermined position, said sheet having a leading edge, a trailing edge and a body portion extending between said leading and trailing edges, said apparatus comprising:
- (A) means for moving said sheet past a predetermined position such that said leading edge passes said predetermined position, followed by said body portion, followed by said trailing edge;
- (B) counting means for:
  - (1) counting clock signals having a constant frequency during at least a portion of each plurality of consecutive time intervals, each time interval defining consecutive distance intervals of equal length; said leading edge passing said predetermined position during a first one of said intervals, said trailing edge passing said predetermined position during a last one of said intervals, said body portion passing said predetermined position during the remaining of said intervals;
  - (2) counting said clock signals during only a portion of said first and last intervals determined by the position of said leading and trailing edges, respectively, during said first and last intervals, respectively; and
  - (3) counting said clock signals during the entirety of the remaining said time intervals; and
- (C) means for determining the length of said sheet as a function of:
  - (1) the ratio between the number of said clocks signals counted during said first time interval and that said time interval which immediately follows said first time interval;
  - (2) the ratio between the number of said clock signals counted during said last time interval and that said time interval immediately preceding said last time interval; and
  - (3) the number of said time intervals between said first and last time intervals.

* * * * *